United States Patent [19]  
Savall

[11] 3,809,240  
[45] May 7, 1974

[54] METHOD OF INJECTING FLUIDS INTO A FLOTATION TANK

[75] Inventor: Vincent Savall, Velizy, France

[73] Assignee: Degremont, Societe Generale D'Epuration & D'Assainissement, Rueil Malmaison, France

[22] Filed: Dec. 6, 1971

[21] Appl. No.: 205,140

[52] U.S. Cl.............. 210/44, 210/221, 261/79 A, 261/121 R, 261/DIG. 75
[51] Int. Cl............................................. B01d 21/00
[58] Field of Search ......... 210/19, 44, 50, 63, 220, 210/221, 521, 522; 209/168–170; 261/77, 121 R, 79 A, DIG. 75

[56] References Cited  
UNITED STATES PATENTS 3,446,353  5/1969  Davis .......................... 209/170 X  
3,679,056  7/1972  Haymore ....................... 210/220 X  
2,938,629  5/1960  Hollingsworth et al............ 209/170

Primary Examiner—John Adee  
Assistant Examiner—Robert H. Spitzer  
Attorney, Agent, or Firm—Wenderoth, Lind & Ponack

[57] ABSTRACT

Method of injecting fluids into a flotation tank in which the flotation process is carried out by expanding, within the liquid mass to be treated, which contains particles in suspension, another liquid saturated with a gas under pressure. This method consisting in introducing the liquid saturated with gas under pressure into an enclosure preferably of circular horizontal cross section, to which the liquid to be treated is supplied through the bottom, and causing a stepped expansion of the liquid saturated with gas under pressure before introducing it into the enclosure.

5 Claims, 5 Drawing Figures

METHOD OF INJECTING FLUIDS INTO A FLOTATION TANK

BACKGROUND OF THE INVENTION

The present invention relates in general to methods of injecting fluids into a flotation tank in which the flotation process is carried out by causing a liquid saturated with gas under pressure to expand within the liquid mass to be treated, which contains particles in suspension.

More particularly, the present invention is concerned with an improved method of the type set forth which is applicable, particularly in the treatment of water, to the flotation of previously flocculated water, the flotation being performed by injecting water saturated with air under pressure into the flotation tank.

Various devices have already been proposed for injecting water saturated with air under pressure into the water to be treated by using the flotation tanks intended for the treatment of waste water. Some of these known devices comprise a common inlet for the water to be treated and the water containing air under pressure. This common inlet is located at the bottom of the flotation tank and comprises concentric conduits having their outlets disposed either vertically or horizontally and tangentially to the injection pit. Other known devices comprise, for the water to be treated and the water saturated with pressurized air, different inlets which are either horizontal and tangent to the injection pit, at different points at the same level, or horizontal and perpendicular to the injection pit at different points and levels. Still other known structures comprise a vertical inlet for the water to be treated and a horizontal inlet for the water saturated with air under pressure, this last-mentioned inlet being tangent or perpendicular to the injection pit, at definitely different levels, for example at levels differing by 10 to 20 inches, for instance.

However, these various known devices are objectionable in that they produce relatively strong local turbulences in the flocculated water, thus damaging the fragile flocculated particles or floc which, being thus fractionated, cannot be reconstituted and therefore treated by the flotation process. Under these conditions, these known devices are suitable for treating a solid floc that cannot be decomposed. On the other hand, they are useless in the case of fragile flocs, as currently encountered in water treatment processes.

On the other hand, in these various known devices the direct expansion of air under pressure is performed through a single expansion member within the treatment enclosure, thus causing large bubbles to build up and therefore reduce the efficiency of the flotation process.

SUMMARY OF THE INVENTION

It is the essential object of the present invention to avoid these inconveniences. It consists essentially in introducing water saturated with air under pressure into an enclosure, preferably a tank having a circular configuration in horizontal section and having a bottom inlet for supplying the flocculated water. The water saturated with air under pressure being directed into the enclosure or tank outside the zone of expansion of the liquid stream consisting of the flocculated water, in order to prevent the development of stray turbulent flows in the flocculated water while preserving the floc coherence. A stepped expansion of the water saturated with air under pressure is produced before introducing it into the enclosure or tank in order to divide the air in the form of micro-bubbles within the floc, the micro-bubbles being distributed uniformly throughout the flocculated mass.

The method of this invention may advantageously be embodied by means of a device comprising a so-called "injection pit" capacity preferably of circular horizontal cross-section, adapted to be disposed at the bottom of the flotation tank, this device being characterized in that the conduit supplying the flocculated water to be treated opens coaxially into the bottom of the injection pit, and that the other conduit delivering water saturated with air under pressure opens horizontally into the pit in an eccentric, non-tangential direction, such that the jet of water saturated with air under pressure cannot impinge against the jet of water to be treated. The other conduit comprises, in the close vicinity of the injection pit, a device adapted to produce the stepped expansion of the water saturated with air under pressure.

BRIEF DESCRIPTION OF THE DRAWINGS

The various features and advantages characterizing this invention will appear more clearly as the following description proceeds with reference to the accompanying drawing of which

DETAILED DESCRIPTION OF THE INVENTION

In this respect it may be pointed out that these embodiments are given solely by way of example, not of limitation, for many other shapes, proportions and arrangements may be resorted to in actual practice without departing from the basic principles of the invention. Furthermore, the case contemplated herein deals with the flotation of flocculated water, but it will readily occur to those conversant with the art that the present invention should not be construed as being strictly limited to this specific case.

Figure 1:
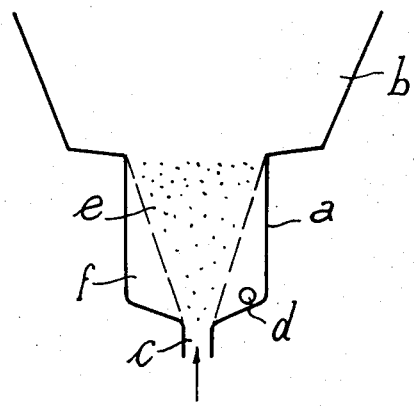
FIGS. 1 to 5 are diagrammatic views illustrating different forms of the device provided for carrying out the method of this invention.
Figure 2:
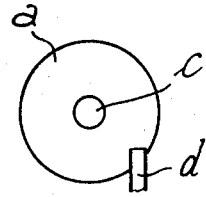

According to a preferred embodiment of the invention, the device for performing the method thereof consists of an injection pit $a$ of cylindrical configuration (FIG. 1) or frustoconical configuration, with a circular horizontal cross-section, disposed at the bottom of the flotation tank $b$.

The flocculated water to be treated is fed vertically through the bottom of the injection pit and coaxially thereto by means of a supply conduit $c$ at a speed of, say, 1 meter/second. In close vicinity of the bottom the water saturated with air under pressure, which may be one recycled fraction of the treated water, is introduced horizontally by means of another conduit $d$ in an eccentric, non-tangential direction. The feed speed of this air-saturated water may be for instance of 1 to 2.5 m/s. The liquid stream shown diagrammatically by the reference letter $e$ and consisting of the flocculated water to be treated, expands or diverges in the injection pit, thus leaving therearound a dead zone $f$ into which the water saturated with air under pressure is actually injected. Thus, the energy due to the speed and expansion of the air-saturated water is absorbed in this dead zone without interfering or modifying the flow of flocculated water. Moreover, due to the eccentric injection of water saturated with air under pressure, the resultant of the two jets becomes slightly oblique, thus producing another advantageous effect namely an improved spreading of the liquid flow all over the surface, thus safely avoiding any alteration or impairment of the coherence of the materials treated according to the flotation process, these materials tending to gather at the surface of the liquid mass contained in the flotation tank.

Figure 3:
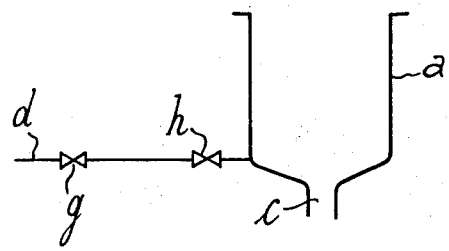

On the other hand, to avoid the formation of large bubbles as a consequence of a sudden expansion of the water saturated with air under pressure and to promote in contrast thereto the building up of micro-bubbles with a certain time lag and only within the floc proper, the conduit $d$ supplying water saturated with air under pressure comprises a suitable expansion or pressure-reducing device capable of eliminating or at least minimizing abnormally high cavitation effects and fractionating the expansion into multiple stages. This device may consist (FIG. 3) of a pair of successive or tandem valves $g$, $h$, located in close vicinity of the injection pit. This device permits a homogeneous distribution of the micro-bubbles throughout the mass of flocculated water.

Figure 4:
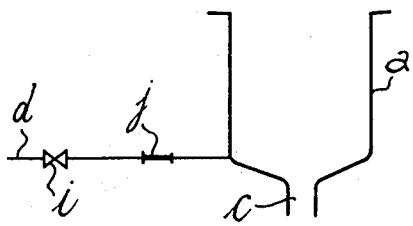

According to another modified embodiment illustrated in FIG. 4, the expansion device associated with the conduit $d$ supplying water saturated with air under pressure consists of a single valve $i$ associated with a tuyere $j$.

Figure 5:
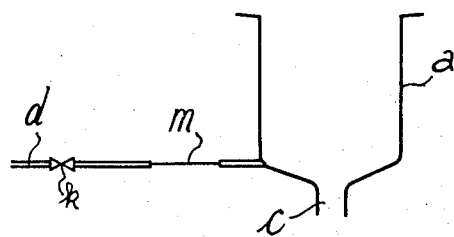

According to a further modification of the device of this invention the expansion means (FIG. 5) associated with the conduit delivering water saturated with air under pressure comprises a valve $k$ and a pipe section $m$ of variable length and of a diameter less than the conduit diameter.

In the various embodiments of the device for carrying out the method of the present invention which are described and illustrated herein the conduit supplying water saturated with air under pressure is disposed preferably a few inches above the bottom of the injection pit.

With these various embodiments of the device constituting the subject-matter of the present invention the efficiency of the flotation process is improved very considerably, and these arrangements are particularly suited for the treatment of flocculated water.

I claim:

1. A method for injecting fluids into a flotation tank as part of a flotation process wherein a liquid saturated with a gas is expanded in a to-be-treated liquid containing particles in suspension, and wherein the entire open top of an injection enclosure opens into the bottom of said flotation tank, said method comprising:

injecting said to-be-treated liquid vertically and coaxially into the bottom of said injection enclosure, and allowing said to-be-treated liquid to diverge in a stream upwardly through said injection enclosure and into said bottom of said flotation tank, while maintaining a dead zone between said stream of to-be-treated liquid and said injection enclosure;

simultaneously introducing said liquid saturated with a gas in a horizontal direction, eccentrically and non-tangentially of the direction of injection of said to-be-treated liquid, into said dead zone within said injection enclosure, while avoiding direct impingement of said liquid saturated with a gas onto said stream of to-be-treated liquid, and causing said liquid saturated with gas to expand within said to-be-treated liquid within said injection enclosure; and effecting a stepped expansion, in plural stages, of said liquid saturated with gas prior to the introduction thereof into said injection enclosure.

2. A method as claimed in claim 1, further comprising passing said liquid saturated with a gas through a conduit up to its point of injection into said dead zone in said injection enclosure.

3. A method as claimed in claim 2, wherein said step of effecting a stepped expansion in plural stages comprises passing said liquid saturated with a gas through two valves positioned in said conduit.

4. A method as claimed in claim 2, wherein said step of effecting a stepped expansion in plural stages comprises passing said liquid saturated with a gas first through a valve positioned in said conduit and then through a reduced diameter section of said conduit.

5. A method as claimed in claim 1, wherein said to-be-treated liquid comprises flocculated water, and wherein said method further comprises forming said liquid saturated with a gas by saturating at least a portion of the water recycled through said flotation tank with a gas under pressure.

* * * * *